US011665336B2

United States Patent
Huang et al.

(10) Patent No.: US 11,665,336 B2
(45) Date of Patent: May 30, 2023

(54) ESTIMATION METHOD FOR SIGNAL QUALITY INDICATOR OF ADVANCED TELEVISION SYSTEMS COMMITTEE STANDARDS

(71) Applicant: REALTEK SEMICONDUCTOR CORP., Hsinchu (TW)

(72) Inventors: Wen-Yu Huang, Hsinchu (TW); Hsin-Pei Lee, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 17/892,773

(22) Filed: Aug. 22, 2022

(65) Prior Publication Data
US 2023/0058268 A1    Feb. 23, 2023

(30) Foreign Application Priority Data
Aug. 23, 2021    (TW) ................. 110130983

(51) Int. Cl.
H04N 17/00    (2006.01)
H04N 17/04    (2006.01)

(52) U.S. Cl.
CPC ........... *H04N 17/004* (2013.01); *H04N 17/04* (2013.01)

(58) Field of Classification Search
CPC ....... H04N 17/004; H04N 17/00; H04N 17/04
USPC ........................................ 348/193, 192, 180
See application file for complete search history.

(56) References Cited

U.S. PATENT DOCUMENTS

| 7,646,805 | B2 | 1/2010 | Cho | |
|---|---|---|---|---|
| 8,134,598 | B2* | 3/2012 | Kawada | H04N 17/02 348/192 |
| 2008/0074497 | A1 | 3/2008 | Kuh | |
| 2013/0038739 | A1* | 2/2013 | Asjadi | H04B 7/088 348/180 |

OTHER PUBLICATIONS

NorDig, "NorDig Unified Requirements", NorDig Unified ver 2.5.1, Aug. 25, 2014, pp. 1-209.

* cited by examiner

*Primary Examiner* — Sherrie Hsia
(74) *Attorney, Agent, or Firm* — Li & Cai Intellectual Property (USA) Office

(57) ABSTRACT

An estimation method suitable for a receiver and includes the following steps: calculating a relative signal-to-noise ratio, and determining whether the relative signal-to-noise ratio is higher than, lower than or within a threshold range; in response to determining that the relative signal-to-noise ratio is higher than the threshold range, estimating the signal quality indicator as a first preset value, wherein the first preset value represents a best signal quality; in response to determining that the relative signal-to-noise ratio is higher than the threshold range, estimating the signal quality indicator as a first preset value, wherein the first preset value represents a best signal quality; in response to determining that the relative signal-to-noise ratio is within the threshold range, estimating the signal quality indicator as an output value of a function according to a bit error rate, wherein an input value of the function is the relative signal-to-noise ratio.

6 Claims, 5 Drawing Sheets

ESTIMATION METHOD FOR SIGNAL QUALITY INDICATOR OF ADVANCED TELEVISION SYSTEMS COMMITTEE STANDARDS

CROSS-REFERENCE TO RELATED PATENT APPLICATION

This application claims the benefit of priority to Taiwan Patent Application No. 110130983, filed on Aug. 23, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an estimation method for a signal quality indicator (SQI) of the Advanced Television Systems Committee (ATSC) standard, and more particularly to an estimation method that uses a signal-to-noise ratio (SNR) to calculate the signal quality indicator of the ATSC standard.

BACKGROUND OF THE DISCLOSURE

The ATSC standard is a mainstream digital TV standard in North America, with latest versions thereof having evolved from ATSC 1.0 to ATSC 3.0. However, a method for representing signal quality in ATSC 3.0 has not yet been defined, so that the quality of the signal is difficult to be quantized.

SUMMARY OF THE DISCLOSURE

In response to the above-referenced technical inadequacies, the present disclosure provides an estimation method for a signal quality indicator of the ATSC standard.

In one aspect, the present disclosure provides an estimation method suitable for a receiver, and the estimation method includes the following steps: calculating a relative signal-to-noise ratio, and determining whether the relative signal-to-noise ratio is higher than, lower than or within a threshold range; in response to determining that the relative signal-to-noise ratio is higher than the threshold range, estimating the signal quality indicator as a first preset value, wherein the first preset value represents a best signal quality; in response to determining that the relative signal-to-noise ratio is higher than the threshold range, estimating the signal quality indicator as a first preset value, wherein the first preset value represents a best signal quality; in response to the relative signal-to-noise ratio is within the threshold range, estimating the signal quality indicator as an output value of a function according to a bit error rate, wherein an input value of the function is the relative signal-to-noise ratio.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
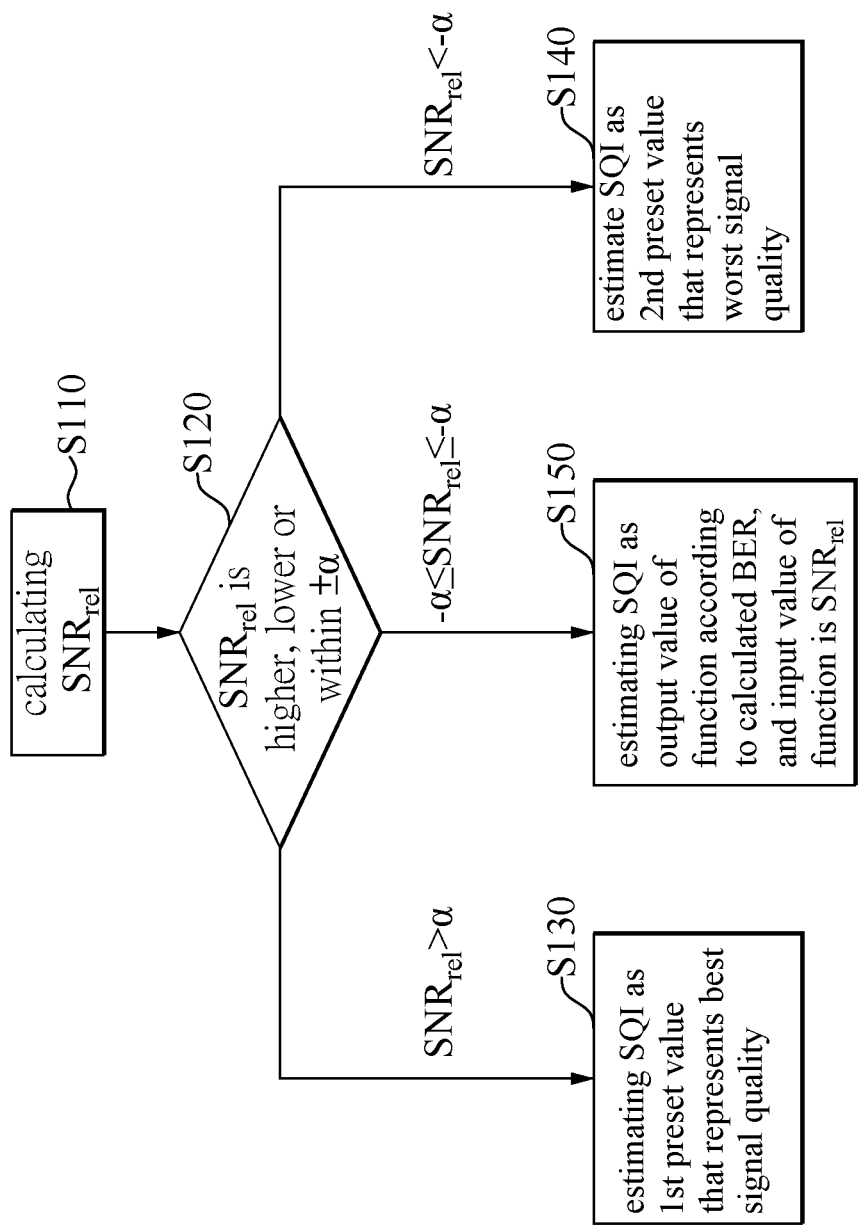
FIG. 1 is a flow chart of an estimating method for a signal quality indicator of the ATSC standard provided by the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
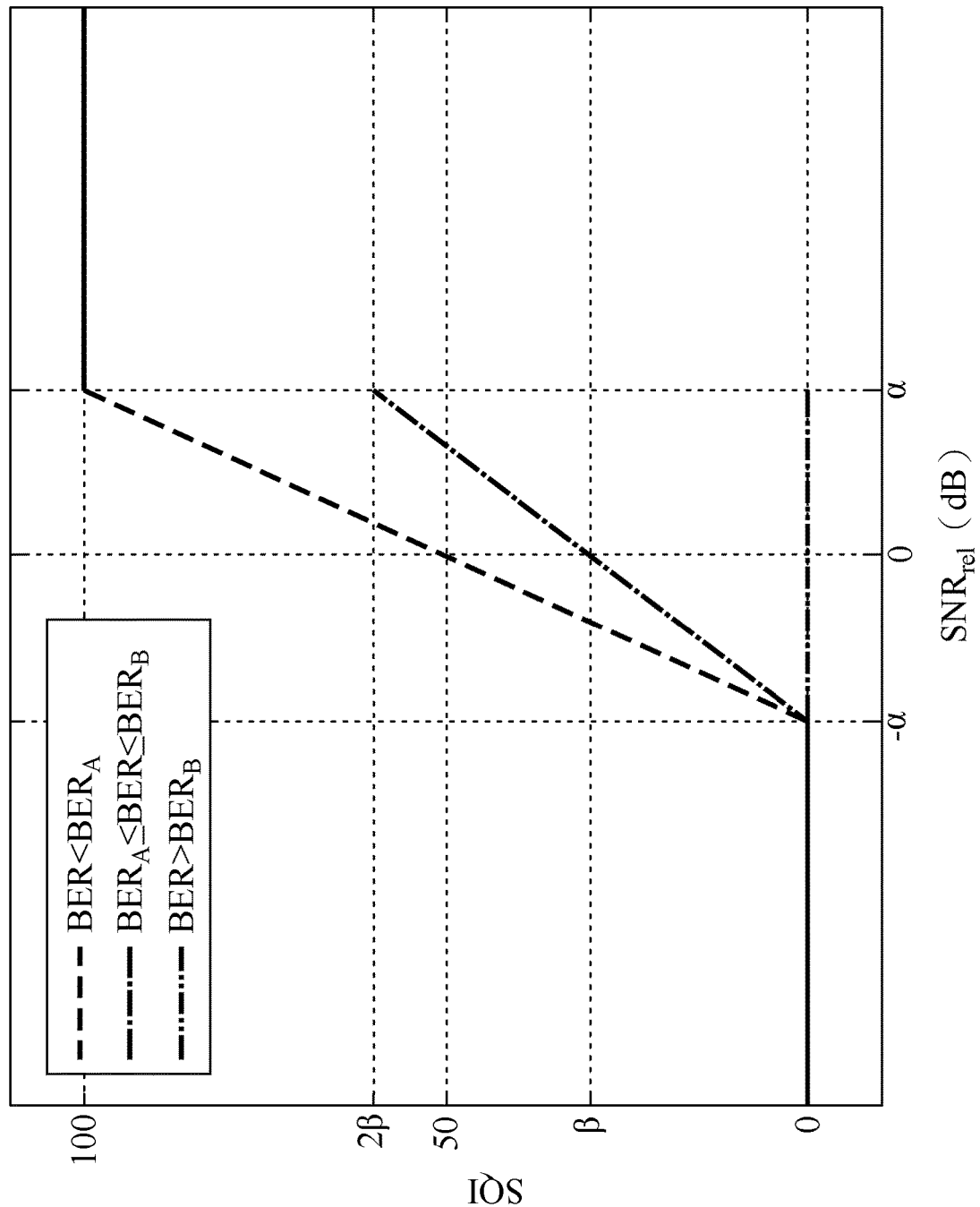
FIG. 2 is a schematic diagram showing an estimation of a signal quality indicator of an ATSC standard provided by one embodiment of the present disclosure.

Referring to FIGS. 1 and 2, FIG. 1 is a flow chart of an estimating method for a signal quality indicator of an ATSC standard provided by the present disclosure, and FIG. 2 is a schematic diagram showing an estimation of a signal quality indicator of the ATSC standard provided by one embodiment of the present disclosure. It should be noted that the ATSC standard mentioned in the present disclosure takes ATSC 3.0 as an example, but the present disclosure is not limited thereto. In addition, the method of FIG. 1 is applicable to a receiver, and the receiver receives a signal transmitted by a transmitter that complies with the ATSC standard, but the present disclosure does not limit specific implementations of the receiver and the transmitter. The receiver performs a channel estimation based on the received signal and a pilot pattern used by the transmitter to calculate an actual signal-to-noise ratio of the receiver.

On the other hand, since the ATSC 3.0 utilizes error correction codes to encode the data, the receiver can correct errors of the data during a decoding process, and can also calculate the bit error rate after demodulation. It should be noted that, the better the transmission quality of the channel, the higher the signal-to-noise ratio and the lower the bit error rate. On the contrary, the poorer the transmission quality of the channel, the lower the signal-to-noise ratio and the higher the bit error rate. Furthermore, channel conditions required for different modulation parameters and different error correction code parameters are different. For example, the higher the modulation mode, the better the channel conditions that are required will be. Therefore, the receiver defines a reference signal-to-noise ratio and a relative signal-to-noise ratio threshold according to modulation parameters and error-correction code parameters that are used by the transmitter to transmit the signal.

In one embodiment of the present disclosure, the reference SNR is defined to be 2.5 decibels (dB) to 3 dB higher than the minimum SNR that the receiver can withstand when the bit error rate is equal to 0, and the relative SNR threshold is usually 3. However, for a higher modulation mode (e.g., 4096 QAM), the RSNR threshold can be slightly less than 3 dB, and for a lower modulation mode (e.g., QPSK), the RSNR threshold can be slightly greater than 3 dB. The present disclosure does not limit the specific values of the reference SNR and the relative SNR thresholds. In addition, in one embodiment of the present disclosure, the relative signal-to-noise ratio ($SNR_{rel}$) is defined as a difference obtained by subtracting the reference signal-to-noise ratio from the actual signal-to-noise ratio of the receiver. Therefore, as shown in FIG. 1, after step S110 of calculating the relative signal-to-noise ratio, the receiver proceeds to step S120 to determine whether the relative signal-to-noise ratio is higher, lower or within the threshold range (+α).

In other words, the threshold range ranges from α to −α, and α is the relative signal-to-noise ratio threshold defined by the receiver according to the modulation parameters. Next, in response to determining that the relative signal-to-noise ratio is higher than the threshold range (i.e., $SNR_{rel} > \alpha$), the receiver proceeds to step S130 to estimate the signal quality indicator as a first preset value. The first preset value represents a best signal quality, meaning that a transmission quality of a current channel is very good, and that the signal-to-noise ratio is very high. In addition, in response to determining that the relative signal-to-noise ratio is lower than the threshold range (i.e., $SNR_{rel} < -\alpha$), the receiver proceeds to step S140 to estimate the signal quality indicator as a second preset value. The second preset value represents a worst signal quality, meaning that the transmission quality of the current channel is very poor, and that the signal-to-noise ratio is very low. For the ease of illustration in the following description, as shown in FIG. 2, the first preset value and the second preset value are exemplified as being 100 and 0, respectively, in the instant embodiment, but the present disclosure is not limited thereto.

Figure 3:
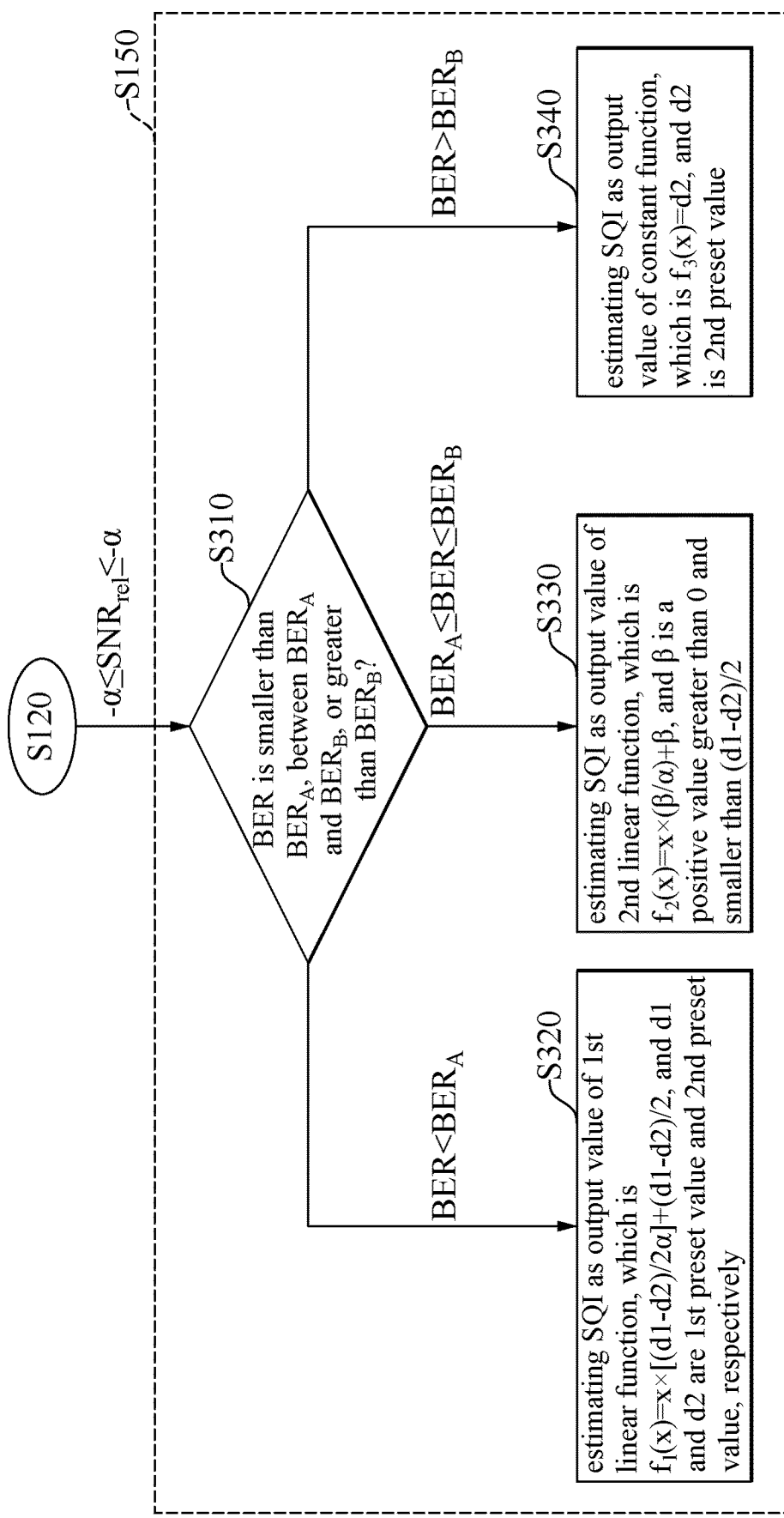
FIG. 3 is a flow chart showing an estimation of the signal quality indicator according to a bit error rate in the method of FIG. 1.

On the other hand, in response to determining that the relative signal-to-noise ratio is within the threshold range (i.e., $-\alpha \leq SNR_{rel} \leq \alpha$), the receiver proceeds to step S150 to estimate the signal quality indicator as an output value of a function according to the calculated bit error rate (BER), and an input value of the function is the relative signal-to-noise ratio. It should be noted that since the bit error rate in the threshold range changes drastically, as shown in FIG. 2, the present disclosure can define the signal quality indicator as output values of different functions according to the bit error rates of different levels. However, to distinguish the different levels of the bit error rates, the receiver further defines a first reference bit error rate ($BER_A$) and a second reference bit error rate ($BER_B$), and the second reference bit error rate is greater than the first reference error rate. Therefore, FIG. 3 is a flow chart showing an estimation of the signal quality indicator according to a bit error rate in the method of FIG. 1. As shown in FIG. 3, step S150 can include steps S310, S320, S330 and S340. In step S310, the receiver further determines whether the bit error rate is smaller than the first reference bit error rate, between the first reference bit error rate and the second reference bit error rate, or greater than the second reference bit error rate.

In response to determining that the bit error rate is lower than the first reference bit error rate, i.e., $BER<BER_A$, the receiver executes step S320 to estimate the signal quality indicator as an output value of a first linear function, and the first linear function is $f_1(x)=x \times [(d1-d2)/2\alpha]+[(d1-d2)/2]$. It should be noted that d1 and d2 are the first preset value and the second preset value, respectively, but the present disclosure does not limit the specific values of the first preset value and the second preset value. That is, the receiver can substitute the relative signal-to-noise ratio as x into the first linear function to obtain $f_1(x)$ taken as the signal quality indicator of the ATSC standard, and in a case of this embodiment where the first preset value and the second preset values are exemplified as being 100 and 0, respectively, the first linear function can be simplified to $f_1(x)=x \times (50/\alpha)+50$, as is represented by a dotted line in FIG. 2.

In addition, in response to determining that the calculated bit error rate is between the first reference bit error rate and the second reference bit error rate, that is, $BER_A \leq BER \leq BER_B$, the receiver executes step S330 to estimate the signal quality indicator as an output value of a second linear function, and the second linear function is $f_2(x)=x \times (\beta/\alpha)+\beta$, that is, a one-point chain line in FIG. 2. It should be noted that β is also defined by the receiver according to the modulation parameters and the error correction code parameters used by the transmitter to transmit signals. However, since a slope of the second linear function should be smaller than a slope of the first linear function, β is a positive value greater than 0 and smaller than (d1−d2)/2, but the present disclosure does not limit the specific value of β. That is, the receiver can substitute the relative signal-to-noise ratio as x into the first linear function to obtain $f_2(x)$ taken as the signal quality indicator of the ATSC standard, and in a case of this embodiment that the first preset value and the second preset value are exemplified as being 100 and 0, respectively, β in FIG. 2 must be greater than 0 and less than 50, for example, 30, but the present disclosure is not limited thereto.

On the other hand, in response to determining that the calculated bit error rate is greater than the second reference bit error rate, that is, $BER>BER_B$, the receiver executes step S340 to estimate the signal quality indicator as an output value of a constant function, and the constant function is $f_3(x)=d2$. It should be noted that, similar to the case where the relative signal-to-noise ratio is lower than the threshold range, the bit error rate greater than the second reference bit error rate can also represent that the transmission quality of the current channel is very poor. That is to say, the receiver also estimates the signal quality indicator of the ATSC standard as the second preset value to represent the worst signal quality. Further, in a case where the second preset value is 0 in the present disclosure, the constant function can be simplified to $f_3(x)=0$ (or referred to as a zero function), as is represented by a two-point chain line in FIG. 2. Since the relative signal-to-noise ratio is used as the input value of the function in this embodiment, and the relative signal-to-noise ratio is related to the actual signal-to-noise ratio of the receiver, the present disclosure uses the signal-to-noise ratio to calculate the signal quality indicator in step S150.

Figure 4:
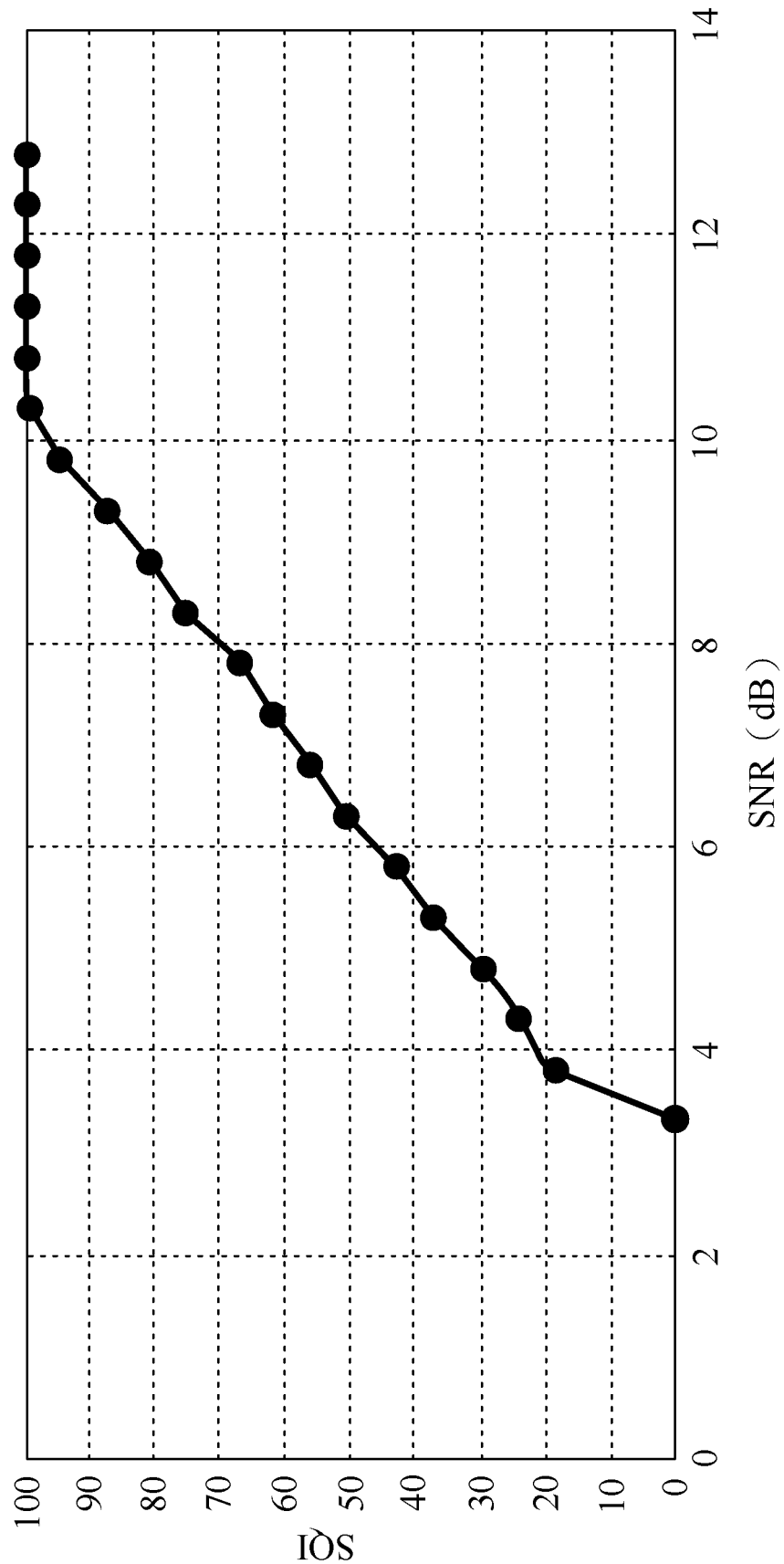
FIG. 4 and FIG. 5 are schematic diagrams of the signal quality indicator corresponding to the signal-to-noise ratios obtained by different parameters in the embodiment of FIG. 2 according to the present disclosure.
Figure 5:
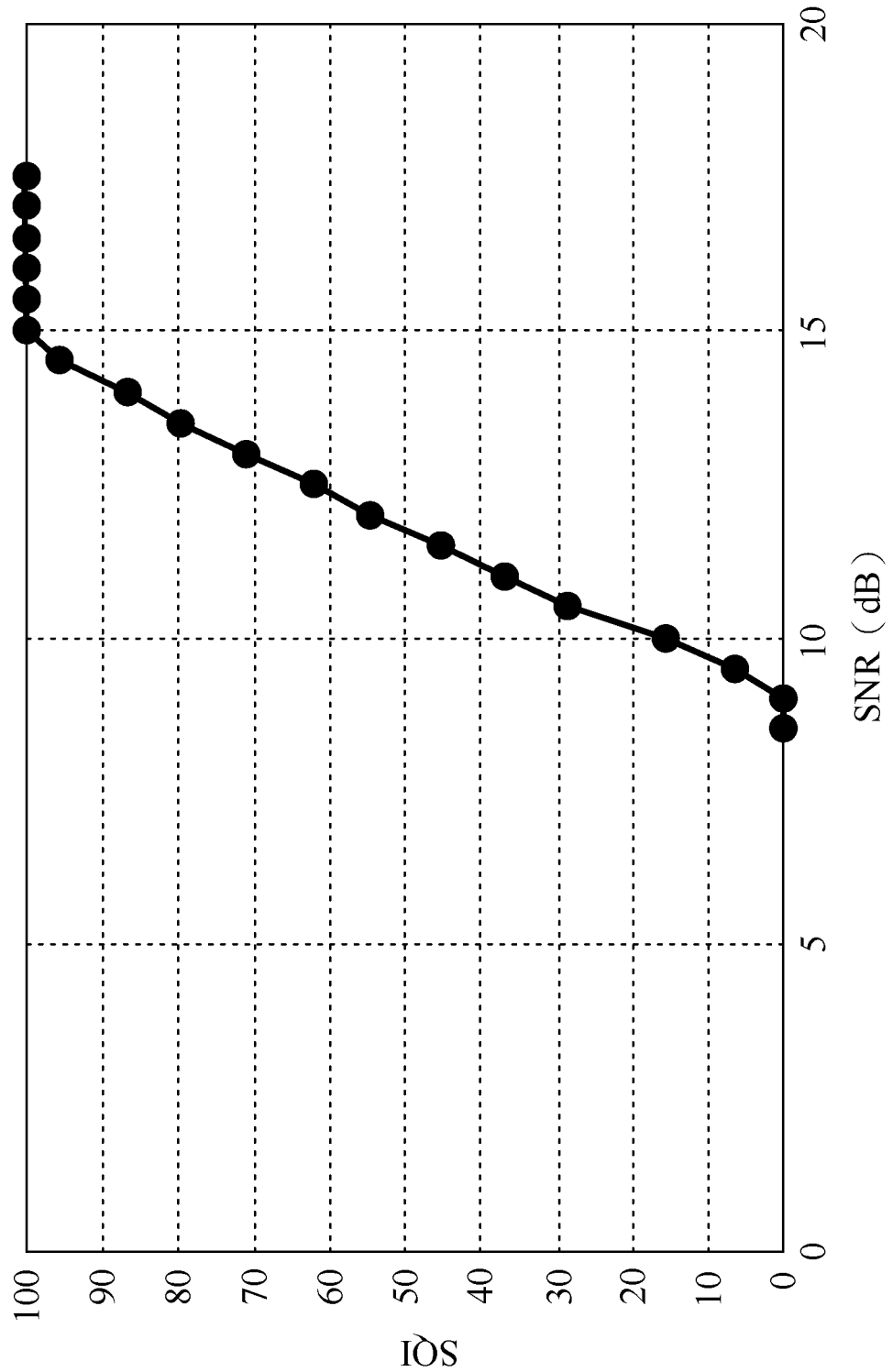

Finally, reference is made to FIG. 4 and FIG. 5, which are schematic diagrams of the signal quality indicator corresponding to the signal-to-noise ratios obtained by different parameters in the embodiment of FIG. 2 according to the present disclosure. For example, the reference SNR and the relative SNR thresholds in FIG. 4 are defined as 6.8 dB and 4, respectively, based on the modulation mode of 1024 QAM, the code length of 64800, and the code rate of 2/15. Therefore, in a case where the signal-to-noise ratio in FIG. 4 is higher than 10.8 dB, the receiver can estimate the signal quality indicator of the ATSC standard as 100. In addition, the reference signal-to-noise ratio and the relative signal-to-noise ratio thresholds in FIG. 5 are defined as 12.2 dB and 3, respectively, based on the modulation mode of 2560 QAM, the code length of 64800 and the code rate of 5/15. Therefore, in a case where the signal-to-noise ratio in FIG. 5 is higher than 15.2 dB, the receiver can estimate the signal quality indicator of the ATSC standard as 100. It should be noted that FIG. 4 and FIG. 5 are for referential purposes only.

In conclusion, in the estimation method for the signal quality indicator of the ATSC standard provided by the present disclosure, the above-referenced technical inadequacies that the signal quality cannot be expressed can be overcome, making it easier for the transmission quality of the current channel to be identified, such as to allow the receiver and the transmitter are able to make appropriate transmission adjustments.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An estimation method for a signal quality indicator of the Advanced Television Systems Committee (ATSC) standard, suitable for a receiver, and the estimation method comprising:
   calculating a relative signal-to-noise ratio, and determining whether the relative signal-to-noise ratio is higher than, lower than or within a threshold range;
   in response to determining that the relative signal-to-noise ratio is higher than the threshold range, estimating the signal quality indicator as a first preset value, wherein the first preset value represents a best signal quality;
   in response to determining that the relative signal-to-noise ratio is lower than the threshold range, estimating the signal quality indicator as a second preset value, wherein the second preset value represents a worst signal quality; and
   in response to determining that the relative signal-to-noise ratio is within the threshold range, estimating the signal quality indicator as an output value of a function according to a bit error rate, wherein an input value of the function is the relative signal-to-noise ratio.

2. The estimation method according to claim 1, wherein the receiver receives a signal transmitted by a transmitter that complies with the ATSC standard, the receiver performs a channel estimation according to the received signal and a pilot pattern used by the transmitter, so as to calculate an actual signal-to-noise ratio of the receiver, and the receiver defines a reference signal-to-noise ratio and a relative signal-to-noise ratio threshold according to modulation parameters and error-correction code parameters that are used by the transmitter to transmit the signal.

3. The estimation method according to claim 2, wherein the reference signal-to-noise ratio is defined as being 2.5 dB to 3 dB higher than a minimum signal-to-noise ratio that the receiver can withstand when the bit error rate is equal to 0, and the relative signal-to-noise ratio is a difference between the actual noise-to-noise ratio of the receiver and the reference signal-to-noise ratio.

4. The estimation method according to claim 3, wherein the threshold range ranges from $\alpha$ to $-\alpha$, and $\alpha$ is the relative signal-to-noise ratio threshold.

5. The estimation method according to claim 4, wherein the receiver further defines a first reference bit error rate and a second reference bit error rate, and the second reference bit error rate is greater than the first reference bit error rate.

6. The estimation method according to claim 5, wherein the step of estimating the signal quality indicator as the output value of the function according to the bit error rate includes:
   determining whether the bit error rate is smaller than the first reference bit error rate, between the first reference bit error rate and the second reference bit error rate, or greater than the second reference bit error rate;
   in response to determining that the bit error rate is smaller than the first reference bit error rate, estimating the signal quality indicator as an output value of a first linear function, wherein the first linear function is $f_1(x)=x\times[(d1-d2)/2\alpha]+[(d1-d2)/2]$, and d1 and d2 are the first preset value and the second preset value, respectively;
   in response to determining that the bit error rate is between the first reference bit error rate and the second reference bit error rate, estimating the signal quality indicator as the output value of a second linear function, wherein the second linear function is $f_2(x)=x\times(\beta/\alpha)+\beta$, where $\beta$ is a positive number greater than 0 and less than $(d1-d2)/2$; and
   in response to determining that the bit error rate is greater than the second reference bit error rate, estimating the signal quality indicator as an output value of a constant function, the constant function being $f_3(x)=d2$.

* * * * *